United States Patent
Cendejas Santana et al.

(10) Patent No.: US 8,815,960 B2
(45) Date of Patent: *Aug. 26, 2014

(54) DEMULSIFYING AND DEHYDRATING FORMULATIONS FOR HEAVY CRUDE OILS BASED ON BLOCK COPOLYMERS BIFUNCTIONALIZED WITH AMINES

(75) Inventors: Gabriel Cendejas Santana, Mexico City (MX); Eugenio Alejandro Flores Oropeza, Mexico City (MX); Laura Verónica Castro Sotelo, Mexico City (MX); Aristeo Estrada Buendía, Mexico City (MX); Marcelo Lozada y Cassou, Mexico City (MX); Flavio Salvador Vázquez Moreno, Mexico City (MX)

(73) Assignee: Instituto Mexicano Del Petroleo, Mexico City (MX)

( * ) Notice: Subject to any disclaimer, the term of this patent is extended or adjusted under 35 U.S.C. 154(b) by 1234 days.

This patent is subject to a terminal disclaimer.

(21) Appl. No.: 12/635,050

(22) Filed: Dec. 10, 2009

(65) Prior Publication Data

US 2010/0140141 A1    Jun. 10, 2010

(30) Foreign Application Priority Data

Dec. 10, 2008 (MX) .................. MX/a/2008/015756

(51) Int. Cl.
| | | |
|---|---|---|
| B01D 17/05 | (2006.01) | |
| C10G 33/04 | (2006.01) | |
| C08L 71/02 | (2006.01) | |
| C08G 65/333 | (2006.01) | |
| C08G 65/325 | (2006.01) | |

(52) U.S. Cl.
CPC .......... *C10G 33/04* (2013.01); *C08G 65/33306* (2013.01); *C08G 2650/58* (2013.01); *C08G 65/33317* (2013.01); *C08L 71/02* (2013.01); *C08G 2650/50* (2013.01)
USPC ........... 516/163; 516/161; 516/162; 516/179; 210/708; 210/732; 210/736; 210/737; 208/188; 208/251 R

(58) Field of Classification Search
USPC .......... 516/161, 162, 163, 179; 210/708, 732, 210/736, 737; 208/188, 251 R
See application file for complete search history.

(56) References Cited

U.S. PATENT DOCUMENTS

| | | |
|---|---|---|
| 2,425,845 A | 8/1947 | Toussaint et al. |
| 3,334,038 A | 8/1967 | Lucas |

(Continued)

FOREIGN PATENT DOCUMENTS

| | | | |
|---|---|---|---|
| DE | 298 812 A5 | * | 3/1992 |
| WO | WO 2006/131699 A1 | * | 12/2006 |
| WO | 2007/115980 | | 10/2007 |

OTHER PUBLICATIONS

Derwent Abstract on EAST, week 199232, London: Derwent Publications Ltd., AN 1992-259975, DD 298 812 A5, (BUNA AG), abstract, pp. 1-2.*

*Primary Examiner* — Daniel S Metzmaier
(74) *Attorney, Agent, or Firm* — Roylance, Abrams, Berdo & Goodman, L.L.P.

(57) ABSTRACT

The present invention relates to demulsifying and dehydrating formulations of heavy crude oil based block copolymers amine bifunctionalized with low polydispersities. These formulations can contain solvents whose boiling point is in the range from 35 to 200° C., preferably: dichloromethane, chloroform, toluene, xylenes, turbosine, naphtha or mixtures thereof.

8 Claims, 4 Drawing Sheets

(56) References Cited

U.S. PATENT DOCUMENTS

| | | | | |
|---|---|---|---|---|
| 3,699,051 A | * | 10/1972 | Sampson | 516/165 |
| 3,782,472 A | * | 1/1974 | Siess, Jr. | 166/303 |
| 3,835,060 A | | 9/1974 | Maddox, Jr. et al. | |
| 4,382,852 A | * | 5/1983 | McCoy et al. | 516/179 |
| 4,384,977 A | * | 5/1983 | Duke | 516/163 |
| 4,439,345 A | * | 3/1984 | Duke | 516/141 |
| 5,421,993 A | * | 6/1995 | Hille et al. | 516/179 |
| 5,445,765 A | | 8/1995 | Elfers et al. | |
| 5,609,794 A | | 3/1997 | Taylor | |
| 6,294,093 B1 | | 9/2001 | Selvarajan et al. | |
| 2004/0266973 A1 | | 12/2004 | Strickland et al. | |
| 2010/0140141 A1 | * | 6/2010 | Cendejas Santana et al. | 208/188 |
| 2012/0261312 A1 | * | 10/2012 | Flores Oropeza et al. | 516/135 |

* cited by examiner

DEMULSIFYING AND DEHYDRATING FORMULATIONS FOR HEAVY CRUDE OILS BASED ON BLOCK COPOLYMERS BIFUNCTIONALIZED WITH AMINES

CROSS-REFERENCE TO RELATED APPLICATION

This application claims the priority to Mexican Patent Application No. MX/a/2008/015756, filed on Dec. 10, 2008, in the Mexican Patent Office, the disclosure of which is hereby incorporated by reference in its entirety.

FIELD OF THE INVENTION

This invention concerns demulsifying and dehydrating formulations for heavy crude oils based on low polydispersity copolymers bifunctionalized with amines.

BACKGROUND OF THE INVENTION

Nowadays, a growing number of petroleum wells are producing a mixture of oil and water. This phenomenon has been observed as in land as in sea installations.

The water coproduced with petroleum may flow free or be emulsioned in oil. The water-in-oil emulsion is present in wells, storage tanks, containers, pipe lines, transporting and in all the processing and refining steps.

Water and petroleum emulsions may be classified in three types:
1st. Water-in-oil (W/O) emulsions,
2nd. Oil-in-Water (0/W) emulsions,
3rd. Complex emulsions.

A water-in-oil emulsion consists of water drops dispersed in a homogeneous petroleum phase whereas an oil-in-water emulsion is a dispersion of petroleum drops in an aqueous phase. This last one is known as an "inversed emulsion". Complex emulsions are made of tiny drops of a phase suspended inside larger drops of another phase, which are suspended themselves in the first phase. Most common kind of emulsions in petroleum industry is W/O emulsions.

Considering water and crude oil as two defined phases, it must be established that the main criteria to define the type of formed emulsion is phase volume. It means that when both phase volumes are compared, the dispersed phase corresponds to that with a smallest volume and the dispersing phase to that with the largest volume.[1,2]

The stability of water in crude oil emulsions depends strongly on the adsorption-desorption kinetics and rheological properties of the interfacial layer. This last one is formed as a consequence of the supramolecular interactions of the emulsifier molecules with high boiling points, as asphaltenes and resins, which decrease petroleum interfacial tension and provoke the water drop dispersion. The asphaltenes are molecules containing several condensed aromatic rings with different aliphatic and naphthenic substituents, which are able to pile up, coordinating simultaneously with water droplets and hindering their coalescence.

Emulsions may be classified in three types:
1. Weak emulsions: they break in few minutes and free water is immediately obtained.
2. Middle emulsions: they require at least 10 minutes to break up.
3. Squashed emulsions: A period of several hours or even days is needed to reach partial or complete separation.

Emulsions, being thermodynamically unstable, require certain energy to alter their equilibrium. Nowadays, physical and chemical methods are individually or sequentially applied to break an emulsion of water dispersed in crude oil. Concerning physical methods, the use of electrical fields and mechanical effect devices may be mentioned. These methods may be combined with heating, in order to increment the frequency and strength of collisions between dispersed water drops.[1,2,3]

Chemical treatments to initiate a (W/O) emulsion breakage require the addition of products named demulsifiers, which are surfactants that weaken and break the interfacial layer, increasing by this way the water drop coalescence. The choice of the most convenient chemical demulsifier depends on various factors: its concentration, petroleum characteristics, emulsion mixing and optimal residence time.

Crude oil dehydrating implies mainly a problem of colloidal stability. It has been recognized that the colloidal stability is strongly influenced by the surface features of the drops dispersed in the continuous phase. There are two different types of colloidal stability: a first one which is a consequence of surface electrical charge, strongly dependent on the electrostatic repulsions, and a second one controlled by the adsorption of smaller particles on the drop surface (steric stabilization).

Studies of statistical mechanics and many-bodies physics have shown that the colloidal stability is a result of the energy-entropy balance of the system.[4,5,6] The colloidal stability may be controlled modifying the drop surfaces, augmenting or decreasing the dispersed phase stability. The electrical charge of colloidal particles (in this case water drops) may be modified through pH, salt content and other physic-chemical parameters such as temperature, etc. It is apparent that the greater the surface charge, the greater the stability. Salt addition, of course, provokes a screening of the colloidal electrostatic repulsion and, in consequence, the aggregation of the colloidal particles is induced. These mechanisms are related to the energy control in the previous mentioned balance. On the other hand, the colloidal particle size and the presence of other kind of smaller neutral particles in the aqueous phase, contribute to entropy control. When two colloidal particles approach one to another, a polarization of the surface charge and a new arrangement of the adsorbed particles are given.[4,7,8,9,10]

Demulsifiers used in petroleum industry are formulations of different families of chemical products (ethylene and propylene oxide copolymers, alkoxylated resins of alkylphenol formaldehyde, alkoxylated amines, alkoxylated epoxy resins, etc.) dissolved in one or several solvents such as toluene, xylene, short chain alcohols, naphtha, etc.)[11]

Some important examples mentioned in literature and related to the use of demulsifiers as water-in-oil breakers in petroleum industry are the following:

The polyoxyethylene-polyoxypropylene-polyoxyethylene (POE-POP-POE) and polyoxypropylene-polyoxyethylene-polyoxypropylene (POP-POE-POP) copolymers produced by different companies receive names according to the initiator employed during their synthesis (in example propyleneglycol or ethylendiamine). Some structures are shown in (1).[12,13]

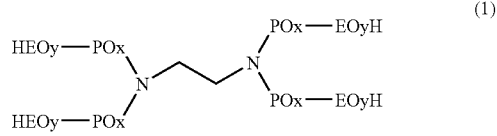

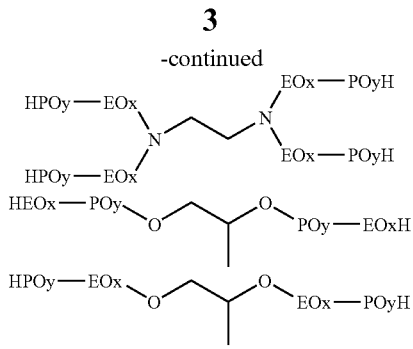

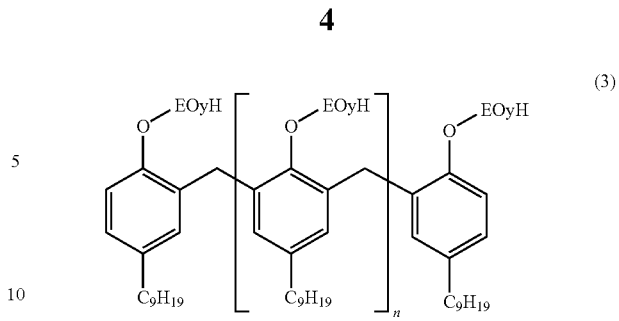

U.S. Pat. Nos. 2,425,845 and 3,334,038 protect the production process of copolymers with a structure (EO-PO-EO) pointing out the use of the following glycols as polymerization initiators ethyleneglycol, 1,2 propyleneglycol, 1,3-propyleneglycol, butyleneglycols, diethyleneglycols, dipropyleneglycols, triethyleneglycol, tripropyleneglycol and other additional aliphatic glycols.

U.S. Pat. No. 3,835,060 describes a process for emulsion breaking, using a formulation of polyglycol alkyl ether sulfates and polyoxyethylene-polyoxypropylene block copolymers. The chemical structure of the polyglycol alkyl ethers employed in this process is presented in (2), where R is the alkyl group (n=1-10 and M is an alkaline, alkaline earth metal or quaternary nitrogen (see formula 2, alkyl ether sulfated polyglycol). Emulsion breakage is reached after 120 minutes, when the mixture is dosed in a concentration interval between 20 and 140 ppm; although the type of crude oil is not specified, it is reported that a maximal separation of 35% of water is obtained along the demulsifier process.

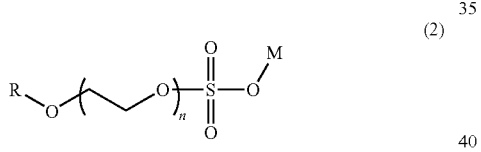

U.S. Pat. No. 5,445,765 discloses demulsifiers made of polyethyleneimines alkoxylated with propylene and ethylene oxides, which may be employed successfully in a temperature interval between 10 and 130° C. and compositions from 0.1 to 200° C. These dehydrating agents were applied on a Western Africa crude oil, obtaining a separation of 47% in three hours. However, the crude oil composition is not mentioned in the patent.

U.S. Pat. No. 5,609,794 discloses the application of polyalkyleneglycol and ethylene oxide, which is esterified with an anhydride in order to form the diester. This compound is made to react with vinyl monomers and synthesized, by this way, different esters. The formulations are applied in a range of concentrations from 10 to 1500 ppm and in an interval between 7 to 80° C. The products are used to dehydrate petroleum (its characteristics are not mentioned) and other different refinery lines (turbosine, gasoline, lubricants, etc.). The document mentions that a separation of 40% of water is reached in few minutes.

U.S. Pat. No. 6,294,093 protects a demulsifying formulation consisting of dicarbamate compounds and a polyalkoxylated alkylphenol resin (see formula 3, alkylphenol resins); the formulations are constituted by water and organic soluble organic compounds, the formulations are introduced into the water-in-oil emulsion at concentration between 50 and 1000 ppm and the petroleum features are not mentioned.

U.S. Patent Publication No. 2004/0266973 describes an alkylphenol arylaldehyde alkoxylated polymer able to separate water-in-oil emulsions, including crude oil and other refined currents. It is applied as a formulation prepared in different organic solvents and naphtha, at concentrations between 1 and 3000 ppm, but the main characteristics of the treated crude oil are not mentioned.

WO 2007/115980 mentions that alkoxylated orto-esters can provoke the separation of water contained in an emulsion. The orto-ester general structure is shown in formula 4, where $R_1$ is H or a hydrocarbonated chain, $R_2$, $R_3$ and $R_4$ are groups C3-C4 alkylenoxy and/or ethylenoxy. The products described by this patent were evaluated in North Sea and Middle East crude oils and synthetic brine. A separation between 30 and 100% was determined for these products.

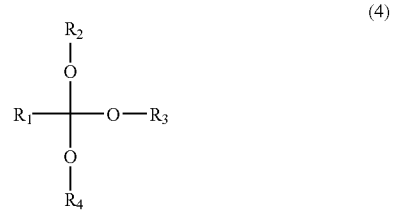

Polyoxyethylene-polyoxyproylene-polyoxyethylene (PEO-PPO-PEO) block copolymers have been functionalized with some amines as ammonia, ethylendiamine and polyethylendiamine, through the substitution of their corresponding α,ω-ditosyl esters (TsO-POE-POP-POE-OTs), this modification is followed by the condensation of the amino groups and the polyacrylic acid[14].

It is mentioned in the cited international references that the described products are added into the crude oil emulsions as dissolutions or formulations including different types of commercial products, which act as coalescence or clarifier agents. It is also established that the different ethylene and propylene oxide units may be present in the polymer chain in any order.

SUMMARY OF THE INVENTION

From an economical and operational point of view is very important to separate the water from the crude oil emulsions and, simultaneously, remove the inorganic salts dissolved in the aqueous phase, diminishing, by this way, the corrosion in petroleum installations and the catalyst poisoning during the refining steps. In addition, the water removing allows reaching the quality parameters of petroleum storage, exportation and employ. Due to the great importance of these technical requirements, we proceeded to develop some series of formulations based on different monodispersed block copolymers amines bifunctionalized, because the cited references do not claim the property of low polydispersity block copolymers, bifunctionalized with the amines mentioned in this document nor formulations containing such kind of copolymers, with similar or better efficiencies as heavy crude oil demulsifiers.

REFERENCES

1. Kokal S. Crude-oil emulsions: A state-of-The-Art Review. *SPE* 2005 February 5-13.
2. Al-Sabagh, A M, Badawi A M and Noor El.Den M R. Breaking water in crude oil emulsions by novel demulsifiers based on maleic anhydride-oleic acid adduct. *Pet. Sci. Tech.* 2002 20 (9-10) 887-914.
3. Selvajaran R, Sivakumar A. and Marble R. A. Aqueous dispersion of an oil soluble demulsifier for breaking crude oil emulsions U.S. Pat. No. 6,294,093 (2001).
4. Kenneth S. Schmitz.-PhD. Department of Chemistry, University of Missouri—Kansas City. VCH, 1993.
5. Kerson Huang, Statistical mechanics, Wiley, New York 1987.
6. Donald A. McQuarrie, Statistical mechanics, Science books, California University, 2000.
7. Lozada-Cassou M. *The Force between Two Planar Electrical Double Layers, J. Chem. Phys.* 80, 3344 (1984).
8. D. Henderson and Lozada-Cassou M. *A Simple Theory for the Force between Spheres Immersed in a Fluid*, J. Colloid and Interface Sci. 114, 180 (1986).
9. Lozada-Cassou M. and E. Díaz-Herrera, *Three Point Extension for Hypernetted Chain and other Integral Equation Theories: Numerical Results, J. Chem. Phys.* 92, 1194 (1990).
10. J. E. Sánchez-Sánchez and Lozada-Cassou M., *Exact Numerical Solution to the Integral Equation Version of the Poisson-Boltzmann Equation for two Interacting Spherical Colloidal Particles*, Chem. Phys. Letters 190, 202 (1992).
11. Environmentally-friendly oil/water demulsifier. WO 2007/115980.
12. Wu J, Xu Yuming, Dabros T and Hamza H. Effect of EO and PO positions in nonionic surfactants on surfactant properties and demulsification performance *Colloids Surf., A: Physicochem. Eng. Aspect* 252 (2005) 79-85.
13. Abdel-Azim A, Zaki N N and Maysour N E S Polyoxyalkylenated amines for breaking water in oil emulsions: effect on structural variations on the demulsifiation efficiency *Pol. Adv. Tech* (1998) 9 159.
14. Wang Y, Goethals E J and Du Prez F E. Association behavior between end-functionalized block copolymers PEO-PPO-PPO and poly(acrylic acid). *Macromol. Chem. Phys.* 205 (13) 1774-1781 (2004).
15. Lozada-Cassou M. and Jiménez-Ángeles F. *"Overcharging by Macroions: Above all, an Entropy Effect"*, in Coloides e Interfases, pp. 159-164, Edited by Luis M. Liz Marzán, et. al., Universidad de Vigo, Vigo España 2003.
16. Jiménez-Ángeles F. and Lozada-Cassou M. *"A Model Macroion Solution Next to a Charged Wall: Overcharging, Charge Reversal, and Charge Inversion by Macroions"*, The Journal of Physical Chemistry B, 108, 7286-7296 (2004).
17. G. Iván Guerrero-García, Enrique González-Tovar, Lozada-Cassou M., Guevara-Rodríguez F. de J. *"The electrical double layer for a fully asymmetric electrolyte around a spherical colloid: An integral equation study"*, The Journal of Chemical Physics 123, 034703 (2005).
18. Cendejas, G. Arreguin F, Flores C, Villalobos I, Flores E and Vazquez F. Novel initiators for the synthesis of propylene oxide oligomers by anionic ring opening polymerization. *Catalysis Today* 130 (2008) 486-491.
19. Cendejas G, Flores-Sandoval C A, Huitrón N, Herrera R, Zamudio-Rivera L S, Beltran H I and Vázquez F. Theoretical and experimental studies of the initiator influence on the anionic ring opening polymerization of propylene oxide. J. Mol. Struc. (2008), 879 (2008) 40-52.
20. Lee Y, Koo H, Jin G, Mo H, Cho M Y, Park J Y, Choi J S and Park S Poly(ethylene oxide sulfide): new poly(ethylene glycol) derivatives degradable in reductive conditions *Biomacromolecules* (2005) 6 24.
21. Cendejas G, Flores C, Arreguin F, Estrada A, Flores E and Vazquez F. Novel aliphatic and aromatic initiators for the synthesis of poly(propylene oxide) by anionic ring opening polymerization, *Theoretical and polymer simulations*, submitted.

BRIEF DESCRIPTION OF THE DRAWINGS

Figures of this invention are graphic showing the results of the assessment of the activity demulsifier and dewatering of the block copolymers α, ω bifunctionalized with amines and some commercial products.

DETAILED DESCRIPTION OF THE INVENTION

Figure 1:
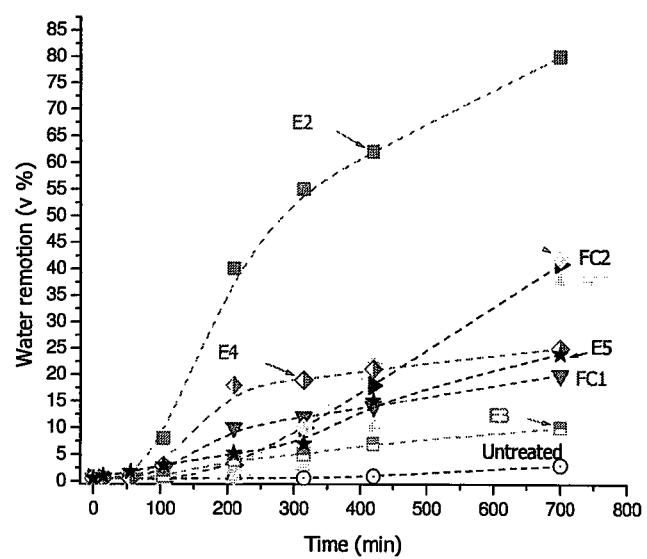
FIG. 1 Demulsifier activities. Examples 1-5, evaluated 500 ppm, 90° C., where: E1=Example 1, E2=Example 2, E3=Example 3, E4=Example 4, E5=Example 5, FC1=commercial Formulation 1, FC2=commercial Formulation 2 and FC3=commercial Formulation 3.

This invention is directed to the preparation of block copolymers bifunctionalized with amines for demulsifying and dewatering heavy crude, as well as formulations of such copolymers. The process followed for the above, basically, comprises or consists of the following:
1. Synthesis of block copolymers with a poly(ethylene oxide)$_w$-poly(propylene oxide)$_y$-poly(ethylene oxide)$_w$ structure.
2. Tosylation (activation of the hydroxyl group for subsequent nucleophilic substitution) of poly(ethylene oxide)$_w$-poly (propylene oxide)-poly(ethylene oxide)$_w$. block copolymers.
3. Nucleophilic substitution of the tosyl groups at the end of the poly(ethylene oxide)$_w$-poly(propylene oxide)$_y$-poly(ethylene oxide)$_w$. block with specific amines.
4. Preparation of formulations based on poly(ethylene oxide)$_w$-poly(propylene oxide)$_y$-poly(ethylene oxide)$_w$. block copolymers, bifunctionalized with amine groups.
5. Demulsifying and dewatering of heavy crude with formulations of block copolymers poly(ethyleneoxide)$_w$-poly(propyleneoxide)$_y$-poly(ethyleneoxide)$_w$, bifunctionalized with amine groups.

The following are described in more detail as expressed in the 5 points above:

This invention is related to the demulsifying and dewatering of heavy crude oil through the use of poly(ethylene oxide)$_w$-poly(propylene oxide)$_y$-poly(ethylene oxide)$_w$ block copolymers, using ethylene glycol as an initiator. These copolymers have been bifunctionalized with amines, and with them were achieved removal of water of the order of 30 to 80% by volume based on the total weight of water in the crude oil and salts of heavy crude oil of the order of 30 to 65% by weight based on the total weight of salts in the crude oil.

The efficiency of the copolymers is attributed to have polydispersities about 1.02 to 1.20, the bifunctionalization with amine and its molecular weight of 800 to 4000 Daltons, and preferably 1000 to 4000 Daltons. In this invention are used copolymers forming macromolecular tangles (particles), which change the entropy, as well as the energy of the colloidal interaction. On the other hand, the high molecular weight of the polymers of the invention promotes their adsorption on the water droplets[15,16,17] due to the need of the system to increase its entropy. Moreover, the functionalized polymer ends are employed to fix the polymer chains to the water droplets, which eventually will suffer a strong aggregation. The nature of the polymer structure, molecular weight and monodispersity promote the molecular diffusion in crude oil, which results in dewatering times of 10 to 40 minutes. However, by the same entropic mechanism, as pointed out above, a polymer with an adequate molecular weight must be employed for each crude oil.

Bifunctionalized block copolymers, whose molecular weight are within the average range between 800 and 4000 Daltons, are illustrated in the formula 5a and 5b.

E, G and J are independently a radical selected from the group consisting of: —H, methyl, ethyl, n-propyl, iso-propyl, sec-butyl, iso-butyl, tert-butyl, n-butyl, phenyl, cyclohexyl and cyclopentyl.

L is a radical represented by methyl and ethyl, and M is a hydroxyl group.

Q is a number between 1 and 5; T is represented by groups E, G and J where T is independently a radical selected from the group consisting of: —H, methyl, ethyl, n-propyl, iso-propyl, sec-butyl, iso-butyl, tert-butyl, n-butyl, phenyl, cyclohexyl, cyclopentyl, $NO_2$, Cl, F and Br.

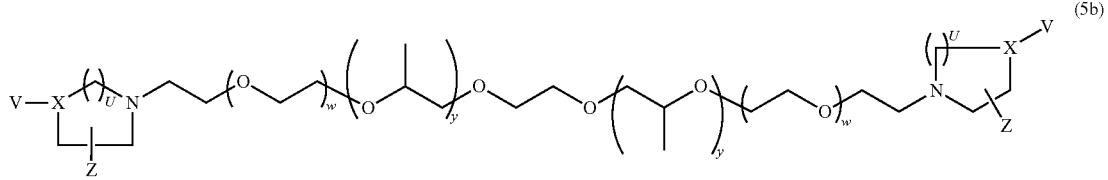
(5b)

Where
W and y are as defined in Formula 5a.
U is a number between 1 and 2.
X is represented by atoms of oxygen and nitrogen, when X is nitrogen then V is represented by, -methyl, ethyl, n-propyl, iso-propyl, sec-butyl, iso-butyl, tert-butyl, n-butyl, phenyl, cyclohexyl, cyclopentyl, and benzyl.
Z is a mono- or di-substitution and is represented by methyl, ethyl, n-propyl, iso-propyl, sec-butyl, iso-butyl, tert-butyl, n-butyl, phenyl, cyclohexyl, cyclopentyl, benzyl and hydroxyl at any position of the 5 or 6 rings members.

The preferred amines of the present invention are: 2-(methylamino)-ethanol, 2-(butylamino)-ethanol, 2-(benzylamino)-ethanol, 2-(cyclohexylamino)-ethanol, 2-(tert-butylamino)-ethanol, 2-(phenylamino)-ethanol, 2-(n-propylamino)-ethanol, 2-(iso-propylamino)-ethanol, 2-(hydroxymethylamino)-ethanol, 2,2'-iminodiethanol, 1,1'-iminodi-2-propanol, 4-(butylamino)-1-butanol, 1-benzylpiperazine, 1-phenylpiperazine, 2-(hexylamino)-ethanol,

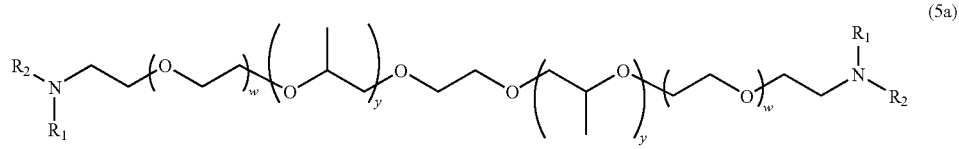
(5a)

Where:
w and y numbers are in the range of 10 to 60, preferably 15 to 55, more preferably between 15 and 50.
$R_1$ and $R_2$ radicals are independently represented by the groups.
—H; —$CH_2(CH_2)_A$B; —CEGJ; —$CH_2$CHLM; —$CH_2(CH_2)_Q$M;

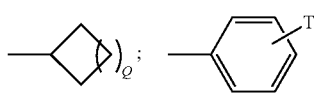

where:
A is a number between 1 and 11, B is H.

1-acetylpiperazine, 1-(orto-chlorophenyl)-piperazine, 1-ethylpiperazine, 1-(meta-tolyl)-piperazine, 1-(4-nitrophenyl)-piperazine, 4-benzylpiperidine, 4-methylpiperidine, 2-methylpiperidine, 2-ethylpiperidine, 3,5-dimethylpiperidine, piperidin-3-ol, piperidin-4-ol, trans-3,5-dimethylpiperidine, cis-3,5-dimethylpiperidine, 3-methylpiperidine, piperidin-3-ylmethanol, 3,3-dimethylpiperidine, 4-phenylpiperidin-3-ol, 4-phenyl-piperidine, 4-(piperidin-4-yl)morpholine, 4,4'-bipiperidine, pyrrolidin-3-amine, 2,6-dimethylmorpholine, morpholine, pyrrolidin-2-ylmethanol, trans-2,5-dimethylpyrrolidine, cis-2,5-dimethylpyrrolidine, diphenylamine, 2-nitro-diphenyl amine, 4-nitro-diphenylamine, pyrrolidine, 4,4"bis(dimethylamino)-diphenylamine, 2,4-dinitro-diphenylamine 4,4'-dimethoxy-diphenylamine, diethylamine, dipropylamine, dibutylamine, dipentylamine, dihexylamine, dioctylamine, didecylamine, didodecylamine, dinonylamine, N-methyl-hexylamine, di-iso-propylamine, N-iso-propyl-tert-butylamine, N-ethyl-tert-butylamine, N-ethyl-butylamine, di-iso-butylamine, iso-butyl-sec-butylamine, di-iso-pentylamine, ethyl-n-dodecylamine, Bis(2-ethylhexyl) amine, di-tert-amyl-amine, N-methyl-pentylamine, N-methyl-butylamine, N-methyl-tert-butilamine, N-ethyl-iso-propylamine, N-ethyl-propylamine, N-methyl-octylamine, piperidine.

Synthesis of Functionalized Block Copolymer

The synthesis of bifunctionalized block copolymers, which are effective in demulsification and dewatering of crude light, Maya and mainly heavy crude oil, comprises four stages:
1) Initiator preparation, consisting of potassium glycolate, 2) Polymerization of a central block of propylene oxide, 3) Polymerization of ethylene oxide, and 4) Functionalization of the triblock copolymer.

1) Initiator preparation: In a balloon flask equipped with thermometer, magnetic stirring and a Dean Stark trap and condenser, are placed stoichiometric amounts of ethylene glycol (0.06 to 0.2 moles) and potassium hydroxide (0.07 to 0.21 moles) was dissolved in 50 mL of methanol, stirred and reacted for 1 hour at 80° C. 1 mL benzene is added to the reaction mixture. Once the reaction time is completed, the methanol is removed by distillation, until the ethyleneglycolate is a viscous liquid.

2) Polymerization of propylene oxide: The reactions are carried out in reactor Parr with digital controls the speed agitation, pressure and temperature. The reactor is filled with an appropriate quantity of potassium glycolate (initiator) and monomer and propylene oxide. These amounts can vary between 0.5 and 15 g of initiator per 100 g of propylene oxide. Subsequently, the reactor is drained and pressurized with nitrogen to ensure an inert atmosphere. The temperature should be set between 70 and 90° C. to ensure the smooth progress of polymerization. After 14 hours of reaction conversions are reached between 70 and 85% w, thus homopolymers of propylene oxide with molecular weight ranging between 800 and 3700 g/mol and polydispersities lower rates to 1.30 (high monodispersed).

3) Polymerization of ethylene oxide: Once the first stage of polymerization is complete, ethylene oxide is slowly added in stoichiometric amounts ranging from 0.05 to 0.3 moles in the main reactor at a temperature of 40-60° C. Subsequently, the reactor is drained and pressurized with nitrogen to ensure an inert atmosphere. The relationship of the two monomers of the feed varies from EO/PO: 17-45 mol/mol (17-45 moles of ethylene oxide/mole of propylene oxide). According to the molecular weight desired, once the addition is to complete the reaction by adding stoichiometric quantities of a solution containing phosphoric acid at a concentration 85% (v/v), followed by two volumes of methylene chloride in order to separate copolymer to the organic phase. Then the copolymer was washed with water and separating the phases, the organic phase is evaporated and after 4 hours of reaction conversion reached 90-95% in weight[18-19].

4) Copolymer triblock Functionalization.
4a) Tosylation of poly(ethylene oxide)$_w$-poly(propylene oxide)$_y$-poly(ethylene oxide)$_w$ copolymers (POE-POP-POE).
General procedure for obtaining α,ω ditosyl esters of poly(ethylene oxide)$_w$-poly(propylene oxide)$_y$-poly(ethylene oxide)$_w$, (POE-POP-POE) (formula 8).

In a balloon flask equipped with magnetic stirrer and thermometer were placed 9.1 mmol of copolymer (B) blocks, adding 50 mL of a mixture (1:1) dichloromethane: toluene and kept in agitation for 30 minutes. Subsequently, the reaction flask was placed in an ice bath and, when the temperature reached the range of 5 to 0° C., was slowly added 27.3 mmol of triethylamine, 21.4 mmol tosyl chloride and 0.9 mmol dimethylaminopyridine. The reaction is stirred under these conditions for 6 hours, after the reaction was washed successively with water (3×50 mL of distilled water) and 0.1N HCl (2×25 mL). Finally, the organic phase was separated and concentrated under reduced pressure.[20,21].

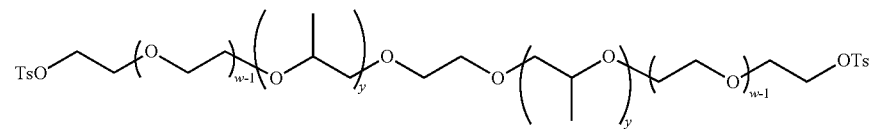

(8)

30

α,ω ditosyl ester of poly(ethylene oxide)$_w$-poly(propylene oxide)$_y$-poly(ethylene oxide)$_w$, (POE-POP-POE), yellow viscous liquid, IR cm −1 2965, 2933, 2856, 1500, 1465, 1368, 1371, 1170, 1100, 777, 700 13C NMR (CDCl3): 17.31, 21.50, 68.6, 69.1, 70.45, 72.81, 73.2, 75.0, 75.2, 75.4, 128.0, 129.8, 133.1, 144.7.

4b) Nucleophilic substitution over α,ω ditosyl ester of poly(ethylene oxide)$_w$-poly(propylene oxide)$_y$-poly(ethylene oxide)$_w$, (POE-POP-POE), using amines.

The process of synthesis continued with the nucleophilic substitution of amines over copolymers tosylates in order to obtain twenty diamines of poly(ethylene oxide)$_w$-poly(propylene oxide)$_y$-poly(ethylene oxide)$_w$ copolymers (FIGS. 5a and 5b), whose spectroscopic characterizations are given below; the synthesis procedure described below, is illustrative but not exhaustive:

In a balloon flask fitted with magnetic stirrer and condenser were placed 6.1 mmol of α,ω ditosyl ester of poly(ethylene oxide)$_w$-poly(propylene oxide)$_y$-poly(ethylene oxide)$_w$, (Mn=2939 δ, I=1.12) and were dissolved in 50 mL of toluene, after were added 15.7 mmol of the secondary amine and heated to reflux for 20 hours. The solvent was removed under reduced pressure and dissolved in dichloromethane (50 mL), the mixture were washed with distilled water (3×50) mL.

Homopolymers and copolymers were characterized using the following instrumental methods:
1.—Infrared Spectrometer Fourier Transform. Brucker® tensor model 27, using the ATR method with the software OPUS®.
2.—Nuclear magnetic resonance spectrometer Varian® BB model at 200 MHz and 50 MHz for $^1$H and $^{13}$C nuclei respectively, using deuterated chloroform and dimethylsulfoxide) as solvents; the shifts are indicated in parts per million (δ) and using tetramethylsilane signal (TMS) as internal standard.
3.—Size exclusion chromatograph (CET) Agilent type using Plegl and tetrahydrofuran (THF) as eluent, to calculate the distribution of molecular weights of the copolymers as well as the polydispersities index (I).

It should be noted that only lists the full details of the copolymers poly(ethylene oxide)$_w$-poly(propylene oxide)$_y$-poly(ethylene oxide)$_w$, (POE-POP-POE).

Characterization of Homopolymers of poly(propylene oxide)$_y$ using Potassium ethyleneglycolate as Initiator Homopolymers synthesized (see (6). Homopolymer poly(propylene oxide)$_y$ (POP), using potassium ethyleneglycolate as initiator) showed in their infrared spectra, the following peaks: 3500-3400 cm$^{-1}$ due to hydroxyl groups, 2900-2850 cm$^{-1}$ corresponding to the presence of methyl and methylene groups confirmed by signals located in 1455 and 1380 cm$^{-1}$, plus a signal 1100-1090 cm-1 which is assigned to C—O vibration of the bond of polyether.

Magnetic Resonance $^{13}$C spectra show the following peaks: (CDCl$_3$): 17.53, 17.67, 65.73, 67.39, 70.1, 73.0, 75.3, 75.5, and 75.7.

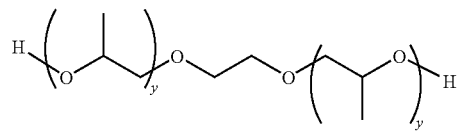

(6)

The synthesized copolymers poly(ethylene oxide)$_w$-poly(propylene oxide)$_y$-poly (ethylene oxide)$_w$, (PEO-PPO-PEO) using as ethyleneglycol potassium initiator (formula 7) showed in their respective spectra of infrared the following signals: 3500-3400 cm$^{-1}$ attributable to hydroxyl groups, 2900-2850 cm$^{-1}$ that correspond to the presence of methyl and methylene groups confirmed by the signals located in 1455 and 1380 cm$^{-1}$, in addition an intense signal 1100-1090 cm$^{-1}$ that is assigned to the vibration of the bond C—O of polyether.

$^{13}$C-NMR analysis show the following signals (DMSO d$_6$): 17.35, 60.43, 70.0, 72.0, 72.8, 74.8, 74.9 ppm.

(7)

The molecular weights were determined by size exclusion chromatography (SEC), they are described in the following table:

Table 1 Number Average Molecular Weights (M$_n$) and polydispersity index (I), determined by (SEC) of copolymers poly (ethylene oxide)$_w$-poly(propylene oxide)$_y$-poly(ethylene oxide)$_w$, (PEO-PPO-POE) using potassium ethyleneglycolate.

TABLE 1

| Copolymer | M$_n$ (g/mol) | I | Physical state |
|---|---|---|---|
| A | 4000 | 1.15 | solid |
| B | 4000 | 1.12 | viscous liquid |
| C | 2900 | 1.17 | viscous liquid |
| D | 2700 | 1.11 | viscous liquid |
| E | 2400 | 1.12 | viscous liquid |
| F | 1700 | 1.14 | viscous liquid |
| G | 1350 | 1.15 | viscous liquid | where:

A, B, C, D, E, F and G are the copolymers poly(ethylene oxide)$_w$-poly (propylene oxide)$_y$-poly(ethylene oxide)$_w$, (PEO-PPO-PEO), which are different by their average molecular weight and its polydispersity index, therefore they are denominated with the letters A to G.

Once obtained copolymers before mentioned the tosylation was made in the conditions that are described previously. Next the spectroscopic characterization of copolymers A-G (see Table No. 1) bifunctionalized with following amines is described, these examples are illustrated but no limitative, considering the following general structures:

(5a)

(5b)

where R$_1$, R$_2$, w, y, U, V, X and Z are as defined above.

The spectroscopic characterization of bifunctionalized block copolymers described in FIGS. 5a and 5b is the following one:

Example 1

α,ω-di(N-tert-butyl, N-ethanol)-amine-poly (ethylene oxide)$_w$-poly(propylene oxide)$_y$-poly(ethylene oxide)$_w$ (R$_1$=ter-butyl, R$_2$=ethanol): viscous liquid; I.R. υ cm$^{-1}$: 3267, 2965, 2933, 2909; 2856, 1464, 1378, 1361, 1222, 1102, 952, 847; $^{13}$C NMR (DMSO d6): 17.1, 28.8, 50.3, 52.4, 58.1, 59.9, 69.1, 70.4, 72.4, 73.3, 75.4, 75.6.

Example 2

α,ω-di-(N-ethyl,N-ethanol)-amine-poly (ethylene oxide)$_w$-poly(propylene oxide)$_y$-poly(ethylene oxide)$_w$ ($R_1$=ethyl, $R_2$=ethanol): viscous liquid; I.R.v cm$^{-1}$: 3450, 2985, 2840, 1450, 1370, 1270, 1220, 1100, 890, 700; $^{13}$C NMR (DMSO d$_6$): 17.43, 42.71, 48.6, 52.7, 55.5, 59.0, 70.5, 72.9, 73.35, 75.1, 75.5.

Example 3

α,ω-di-Morpholinyl-poly(EG)$_w$-poly(ethylene oxide)$_w$-poly(propylene oxide)$_y$-poly(ethylene oxide)$_w$; colorless viscous liquid, I.R.v cm$^{-1}$: 2980, 2920, 2850, 1470, 1370, 1350, 1325, 1270, 1120, 910; $^{13}$C NMR (DMSO d$_6$): 17.11, 53.68, 58.0, 66.65, 68.39, 70.39, 72.72, 73.16, 74.9, 75.19, 75.34.

Example 4

α,ω-diamine-poly(ethylene oxide)$_w$-poly(propylene oxide)$_y$-poly(ethylene oxide)$_w$, ($R_1$=$R_2$=H): colorless viscous liquid; I.R.v cm$^{-1}$: 3400, 2990, 2845, 1450, 1380, 1350, 1100, 910, 850; $^{13}$C NMR (DMSO d$_6$): 17.1, 42.5, 53.3, 68.4, 70.3, 72.7, 73.1, 74.9, 75.1.

Example 5

α,ω-di-piperidinyl-poly(ethylene oxide)$_w$-poly(propylene oxide)$_y$-poly(ethylene oxide)$_w$; colorless viscous liquid, I.R.v cm$^{-1}$: 3379, 2965, 2936, 2864, 1467, 1444, 1377, 1279, 1164, 1100, 858; $^{13}$C NMR (DMSO d$_6$) 17.3, 25.8, 26.2, 54.6, 57.5, 68.7, 70.5, 72.9, 73.3, 75.2, 75.6, 75.5.

Example 6

α,ω-di-pyrrolidinyl-poly(ethylene oxide)$_w$-poly(propylene oxide)$_y$-poly(ethylene oxide)$_w$; colorless viscous liquid, I.R.v cm$^{-1}$: 3385, 2966, 2940, 1461, 14050, 1221, 1146, 1115, 1041, 900 $^{13}$C NMR (DMSO d$_6$) 17.2, 26.2, 54.7, 58.5, 68.9, 70.54, 72.8, 73.4, 75.3, 75.5, 75.6.

Example 7

α,ω-bis-(N,N-diphenyl)-amine-poly poly(ethylene oxide)$_w$-poly(propylene oxide)$_y$-poly(ethylene oxide)$_w$; ($R_1$=$R_2$=phenyl) colorless viscous liquid, I.R.v cm$^{-1}$: 3061, 3024, 2931, 2879, 1592, 1575, 1496, 1343, 1253, 1132, 1100, 864, 750, 694; $^{13}$C NMR (DMSO d$_6$) 17.25, 58.5, 67.9, 70.55, 73.0, 73.35, 75.15, 75.45, 75.57, 117.5, 119.3, 129.4, 149.2.

Example 8

α,ω-di-(N-methyl, N-ethanol)-amine poly(ethylene oxide)$_w$-poly(propylene oxide)$_y$-poly(ethylene oxide)$_w$ ($R_1$=methyl, $R_2$=ethanol): viscous liquid; I.R.v cm$^{-1}$: 3323, 2939, 2866, 2800, 1460, 1377, 1270, 1220, 1100, 1069, 883, 7641; $^{13}$C NMR (DMSO d$_6$): 17.2, 42.9, 57.6, 59.1, 59.8, 68.7, 70.4, 72.7, 73.4, 75.15, 75.8.

Example 9

α,ω-bis-(N,N-diethyl)-amine-poly(ethylene oxide)$_w$-poly (propylene oxide)$_y$-poly(ethylene oxide)$_w$; ($R_1$=$R_2$=ethyl) colorless viscous liquid, I.R.v cm$^{-1}$: 3388, 2973, 2838, 2789, 1473, 1381, 1227, 1156, 1100, 992; $^{13}$C NMR (DMSO d$_6$): 13.5 17.15, 49.7, 55.6, 68.5, 70.6, 73.1, 73.25, 75.25, 75.5, 75.7.

Example 10

α,ω-bis-(N,N-dihexyl)-amine-poly(ethylene oxide)$_w$-poly(propylene oxide)$_y$-poly(ethylene oxide)$_w$; ($R_1$=$R_2$=hexyl) colorless viscous liquid, I.R.v cm$^{-1}$: 3283, 2957, 2927, 2857, 1467, 1378, 1105, 892, 726; $^{13}$C NMR (DMSO d$_6$): 13.9 17.15, 22.8, 27.6, 29.1, 32.4, 54.2, 55.3, 68.9, 69.9, 73.2, 73.8, 75.3, 75.6, 75.8.

Example 11

α,ω-bis-(N,N-dibenzyl)-amine-poly poly(ethylene oxide)$_w$-poly(propylene oxide)$_y$-poly(ethylene oxide)$_w$; ($R_1$=$R_2$=benzyl) colorless viscous liquid, I.R.v cm$^{-1}$: 3086, 3063, 2980, 2944, 2836, 2786, 1601, 1496, 1463, 1366, 1100, 1026, 977, 737, 698; $^{13}$C NMR (DMSO d$_6$): 17.2, 54.6, 60.9, 68.8, 73.2, 73.8, 75.45, 75.7, 75.9.

Example 12

α,ω-bis-(N-benzyl, N-butyl)-amine-poly(ethylene oxide)$_w$-poly(propylene oxide)$_y$-poly(ethylene oxide)$_w$; ($R_1$=benzyl, $R_2$=butyl) colorless viscous liquid, I.R.v cm$^{-1}$: 3309, 2957, 2871, 1646, 1454, 1377, 1200, 1102, 1028, 732, 698; $^{13}$C NMR (DMSO d$_6$): 14.1, 17.4, 20.6, 30.9, 54.6, 55.2, 68.8, 73.0, 73.9, 75.5, 75.7, 75.8.

Example 13

α,ω-di-(N-methyl)-piperazinyl-poly(ethylene oxide)$_w$-poly(propylene oxide)$_y$-poly(ethylene oxide)$_w$; colorless viscous liquid, I.R.v cm$^{-1}$: 3450, 3300, 2980, 2850, 1470, 1370, 1310, 1265, 1220, 1150, 1100, 910, 750; $^{13}$C NMR (DMSO d$_6$): 17.3, 45.9, 53.43, 54.87, 57.74, 70.54, 72.83, 73.3, 75.15, 75.34, 75.52.

Example 14

α,ω-di-(4-phenyl)-piperazinyl-poly(ethylene oxide)$_w$-poly(propylene oxide)$_y$-poly(ethylene oxide)$_w$: viscous liquid; I.R.v cm$^{-1}$: 3270, 3037, 3024, 2943, 2909, 2823, 1609, 1457, 1380, 1234, 1147, 1100, 938, 758, 692, 618, 517; $^{13}$C NMR (DMSO d$_6$): 17.4, 48.7, 51.5, 54.8, 68.9, 70.1, 71.9, 73.1, 75.5, 75.8, 114.1, 118.5, 129.7, 149.6.

Example 15

α,ω-bis-(N,N-dibutyl)-amine-poly(ethylene oxide)$_w$-poly (propylene oxide)$_y$-poly(ethylene oxide)$_w$; ($R_1$=$R_2$=butyl) colorless viscous liquid, I.R.v cm$^{-1}$: 2961, 2931, 2874, 1465, 1436, 1378, 1129, 1100, 960; $^{13}$C NMR (DMSO d$_6$): 13.5 17.15, 20.7, 30.7, 53.7, 55.4, 68.7, 70.3, 73.4, 73.7, 75.4, 75.5, 75.8.

Example 16

α,ω-di-(N-butyl,N-ethanol)-amine poly(ethylene oxide)$_w$-poly(propylene oxide)$_y$-poly(ethylene oxide)$_w$ ($R_1$=butyl, $R_2$=ethanol): viscous liquid; I.R.v cm$^{-1}$: 3450, 2957, 2873, 1468, 1378, 1274, 1204, 1060, 1100, 890, 700; $^{13}$C NMR (DMSO d$_6$): 12.1, 17.25, 20.6, 30.9, 54.5, 55.5, 57.6, 59.1, 68.7, 70.5, 72.8, 73.3, 75.15, 75.7.

Example 17

α,ω-bis-(N,N-diciclohexyl)-amine-poly(ethylene oxide)$_w$-poly(propylene oxide)$_y$-poly(ethylene oxide)$_w$;

($R_1=R_2$=ciclohexyl) colorless viscous liquid, I.R.ν cm$^{-1}$: 2928, 2852, 2761, 1449, 1387, 1261, 1187, 1103, 1050, 974, 849; $^{13}$C NMR (DMSO d$_6$): 17.1, 23.7, 28.2, 32.1, 51.6, 60.3, 69.3, 73.25, 73.6, 75.5, 75.75, 75.9.

Example 18

α,ω-di-(N-benzyl, N-ethanol)-amine poly(ethylene oxide)$_w$-poly(propylene oxide)$_y$-poly(ethylene oxide)$_w$ ($R_1$=benzyl, $R_2$=ethanol): viscous liquid; I.R.ν cm$^{-1}$: 3411, 3062, 3028, 2946, 2931, 2883, 2802, 1602, 1453, 1367, 1248, 1076, 1102, 913, 746, 734; $^{13}$C NMR (DMSO d$_6$): 17.3, 55.8, 57.5, 59.2, 59.5, 68.9, 70.45, 72.5, 73.2, 75.3, 75.7.

Example 19

α,ω-di-(iminodiethanol)-amine poly(ethylene oxide)$_w$-poly(propylene oxide)$_y$-poly(ethylene oxide)$_w$ ($R_1$=ethanol, $R_2$=ethanol): viscous liquid; I.R.ν cm$^{-1}$: 3450, 2980, 2950, 2865, 1650, 1450, 1390, 1320, 1260, 1220, 1105, 900, 720; $^{13}$C NMR (DMSO d$_6$): 17.27, 42.71, 54.39, 57.52, 59.68, 70.54, 72.87, 73.3, 75.14, 75.33, 75.55.

Example 20

α,ω-di-(3-hydroxy)-piperidinyl poly(ethylene oxide)$_w$-poly(propylene oxide)$_y$-poly(ethylene oxide)$_w$: viscous liquid; I.R.ν cm$^{-1}$: 2970, 2938, 2860, 2804, 2776, 1474, 1348, 1262, 1220, 1167, 1100, 960, 786; $^{13}$C NMR (DMSO d$_6$): 17.2, 18.8, 31.8, 54.5, 55.7, 62.5, 68.9, 69.2, 70.1, 71.9, 73.1, 75.5, 75.8.

Evaluation of Block Copolymers
α,ω-Bifuncionalized with Amines, as Demulsifiers
and Dehydrating Agents in Heavy Crude Different concentrated dissolutions were prepared from each one of the bifunctionalized copolymers from 5 to 40% by weight, using dissolvent whose boiling point is in the range of 35 to 200° C., preferably dichloromethane, chloroform, benzene, toluene, xylene, turbosine, gasoline, used alone or in mixtures of them, so that small volumes of the dissolution were added (50 μL-150 μL) and it was avoided that the effect of the dissolvent influenced in the rupture of the emulsion. The copolymers in bifunctionalized blocks were evaluated in concentrations between the range from 100 to 2000 ppm.

The heavy crude oil used for this evaluation was characterized as follows:

TABLE NO. 2

Physicochemical characteristics of crude oil.

| Parameter | Heavy crude oil |
|---|---|
| API ° | 15.9 |
| Salt content | 34 lb/1000 bls |
| Wax | 3.66% |
| Water | 6.80% |
| Saturates | 10.50% |
| Aromatics | 11.75% |
| Resins | 63.38% |
| Asphaltenes | 14.37% |

The amine bifunctionalized block copolymers were evaluated of simultaneous way with commercial formulations of the type (bases of propylene oxide and ethylene oxide, alkyl phenol formaldehyde resin), like demulsifiers and dehydrating agents.

The evaluation procedure is described: the number of provided graduated bottles with inserted and covers is indicated by the number of compounds to evaluate, and one more which it corresponds to the crude one without additive; in each one of them the crude one was added until the mark of 100 milliliters. All the bottles were placed in a water bath with temperature controlled in 90° C. by space of 30 minutes, at the end of that time one aliquot of the dissolution of copolymers in bifunctionalized blocks and the mentioned commercial copolymer formulations was added previously; all the bottles were shaken during 2 minutes at the rate of 2 blows per second. After being bled they were placed again in the bath of controlled temperature and the rupture of the emulsion oil water was read hourly, during the time of the evaluation. All the commercial copolymers reason for this invention and formulations were evaluated to different concentrations between the intervals from 100 to 2000 ppm. By way of demonstration, which does not imply any limitation, are shown in FIGS. 1 to 4, the graphical results of the evaluation described above, at a concentration of 500 ppm. As already mentioned, these figures represent:

FIG. 1. Demulsifying activity of Examples 1-5, evaluated to 500 ppm at 90° C.

Figure 2:
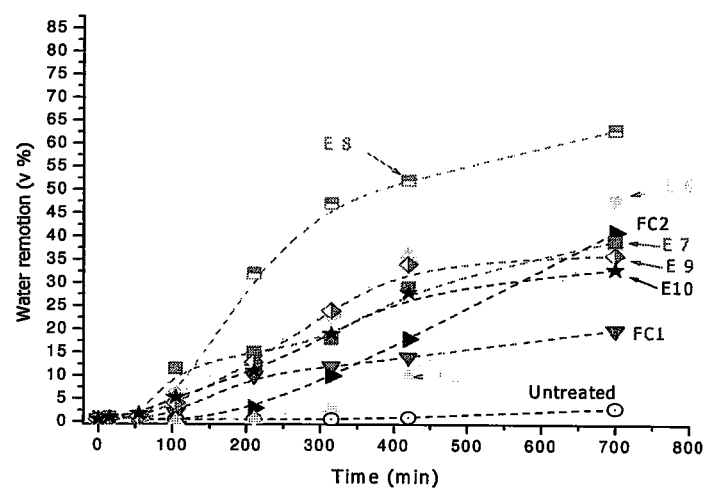
FIG. 2 Demulsifier activities. Examples 6-10, evaluated 500 ppm, 90° C., where: E6=Example 6, E7=Example 7, E8=Example 8, E9=Example 9, E10=Example 10, FC1=commercial Formulation 1, FC2=commercial Formulation 2, and FC3=commercial Formulation 3.

FIG. 2. Demulsifying activity of Examples 6-10, evaluated to 500 ppm at 90° C.

Figure 3:
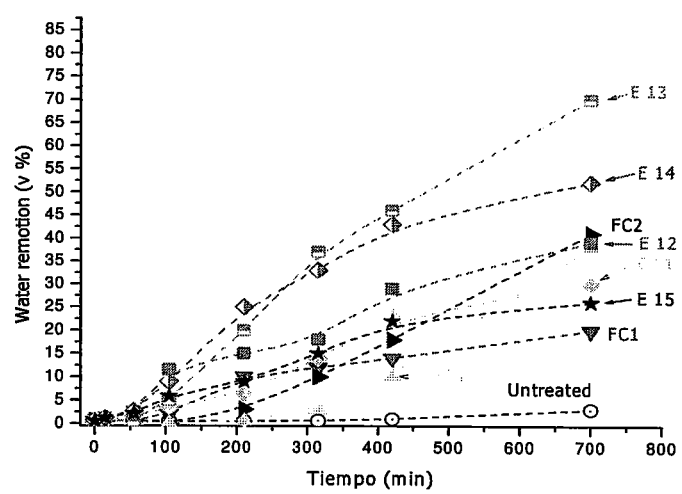
FIG. 3 Demulsifier activities. Examples 11-15, evaluated 500 ppm, 90° C., where: E11=Example 11, E12=Example 12, E13=Example 13, E14=Example 14, E15=Example 15, FC1=commercial Formulation 1, FC2=commercial Formulation 2, and FC3=Formulation.

FIG. 3. Demulsifying activity of Examples 11-15, evaluated to 500 ppm at 90° C.

Figure 4:
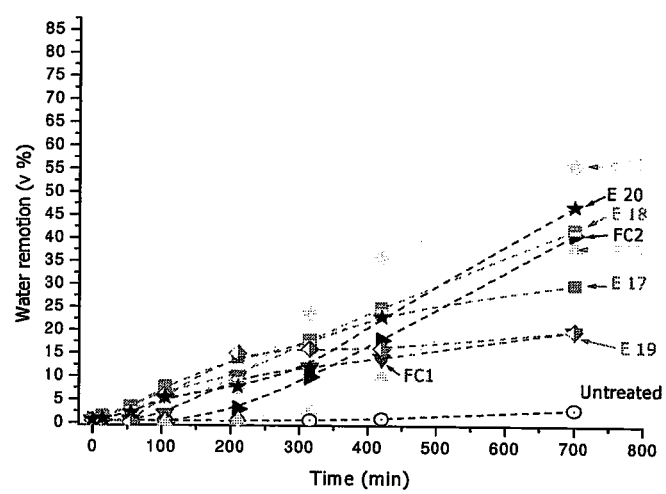
FIG. 4 Demulsifier activities. Examples 16-20, evaluated 500 ppm, 90° C., where: E16=Example 16, E17=Example 17, E18=Example 18, E19=Example 19, E20=Example 20, FC1=commercial Formulation 1, FC2=commercial Formulation 2, and FC3=commercial Formulation 3.

FIG. 4. Demulsifying activity of Examples 16-20, evaluated to 500 ppm at 90° C.

Finally, using a syringe fitted with a long tip, the aqueous phase was separated from the bottle and the remaining crude salts were quantified. The results are shown in Table No. 3.

The commercial formulations are made as follows:
FC1: copolymers of propylene oxide-ethylene oxide (70%), Alkyl-phenol formaldehyde resin (30%).
FC2: copolymers of propylene oxide-ethylene oxide (65%), Alkyl-phenol formaldehyde resin (35%).
FC3: copolymers of propylene oxide-ethylene oxide (85%), Alkyl-phenol formaldehyde resin (15%).

In FIGS. 1 to 4 is shown as follows:
1. Of the three commercial formulations evaluated, FC1, FC2 and FC3, the second shows the best demulsifier performance introduced a long time. FC1 formulation showed higher removal of water at short times.
2. Examples 7 and 12 have a similar performance to the formulation FC2.
3. Examples 1, 2, 6, 8, 13, 14, 16, 18 and 20 demulsifying crude oil more effectively compared to the commercial formulation FC2.
4. Example 2 shows the best performance as demulsifier of heavy oil, because doubling the efficiency of the best commercial formulations, both for short times as long.

Therefore the block copolymer amine bifunctionalized shown in Examples 1, 2, 6, 8, 13, 14, 16, 18 and 20, the occasion of this invention, as demulsifiers, have an advantage in heavy oil, compared to those commercial use. Additionally, Examples 7 and 12 are comparable in efficiency to the best commercial formulation.

TABLE NO. 3

Elimination of salts in heavy oil by using block copolymers amines bifunctionalized

| Example | % Salts removal |
|---|---|
| 1 | 55 |
| 2 | 68 |
| 3 | 14 |

TABLE NO. 3-continued

Elimination of salts in heavy oil by using block copolymers amines bifunctionalized

| Example | % Salts removal |
|---|---|
| 4 | 36 |
| 5 | 34 |
| 6 | 59 |
| 7 | 55 |
| 8 | 69 |
| 9 | 47 |
| 10 | 45 |
| 11 | 42 |
| 12 | 44 |
| 13 | 63 |
| 14 | 59 |
| 15 | 37 |
| 16 | 61 |
| 17 | 39 |
| 18 | 50 |
| 19 | 30 |
| 20 | 55 |
| FC1 | 33 |
| FC2 | 53 |
| FC3 | 51 |

Where:
FC1 = Commercial formulation 1
FC2 = Commercial formulation 2
FC3 = Commercial formulation 3

From Table No. 3 it could be seen that examples 1, 2, 6, 8, 13, 14, 16, 18 and 20, desalinate crude oil more efficiently than the best commercial formulation (FC2).

Therefore, amine bifunctionalized block copolymers of the present invention are more effective in demulsifying and dewatering heavy oil than their commercial counterparts.

While advantageous embodiments have been chosen to illustrate the invention, it will be understood by those skilled in the art that various changes and modifications can be made therein without departing from the scope of the invention as defined in the appended claims.

What is claimed is:

1. A method of demulsifying and desalting an emulsion comprising adding to the emulsion a formulation comprising at least one amine bifunctionalized block copolymer at a concentration of 5 to 50% by weight, in a solvent having a boiling point of 35 to 200° C., wherein said amine bifunctionalized block copolymer has the formula 5a and 5b, and has an average molecular weight within the range between 800 and 4000 Daltons

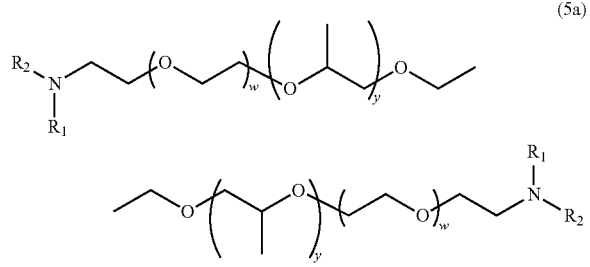

(5a)

where:
w and y are independent integers in the range of 10 to 60 to provide an average molecular weight of between 800 and 4000 Daltons;
$R_1$ and $R_2$ radicals are independently selected from the group consisting of

—H; —$CH_2(CH_2)_4B$; —CEGJ; —$CH_2CHLM$; —$CH_2(CH_2)_QM$;

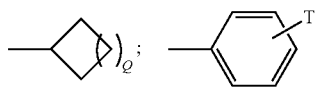

where A is a number between 1 and 9,
B is H,
E, G and J are independently a radical selected from the group consisting of: —H, methyl, ethyl, n-propyl, iso-propyl, sec-butyl, iso-butyl, tert-butyl, n-butyl, phenyl, cyclohexyl, cyclopentyl,
L is a radical represented by methyl or ethyl and M is a hydroxyl group,
Q is a number between 1 and 5, T is selected from the group consisting of —H, methyl, ethyl, n-propyl, iso-propyl, sec-butyl, iso-butyl, tert-butyl, n-butyl, phenyl, cyclohexyl, cyclopentyl, $NO_2$, Cl, F and Br,

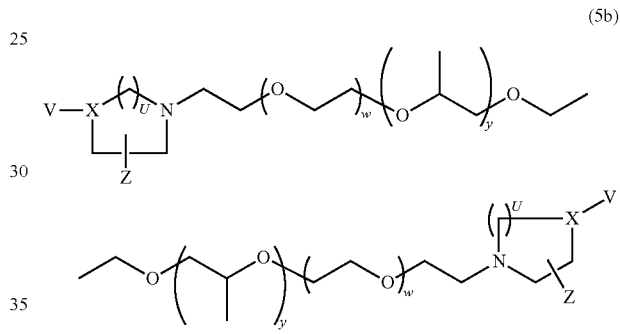

(5b)

where:
U is a number between 1 and 2,
X is represented by atoms of oxygen and nitrogen, when X is nitrogen then V is represented by, -methyl, ethyl, n-propyl, iso-propyl, sec-butyl, iso-butyl, tert-butyl, n-butyl phenyl, cyclohexyl, cyclopentyl, benzy, and
Z is represented by methyl, ethyl, n-propyl, iso-propyl, sec-butyl, iso-butyl, tert-butyl, n-butyl, phenyl, cyclohexyl, cyclopentyl, benzyl or hydroxyl at any position of the 5 or 6 members' rings.

2. The method of claim 1, wherein the formulation includes said copolymer in an amount of 5 to 40% by weight.

3. The method of claim 1, wherein said solvent is selected from the group consisting of dichloromethane, chloroform, benzene, toluene, xylenes, turbosine, naphtha, and mixtures thereof.

4. A method of dewatering and desalting crude oil comprising admixing crude oil and an amine bifunctionalized block copolymer having the formula 5a and 5b, and having an average molecular weight within the range between 800 and 4000 Daltons

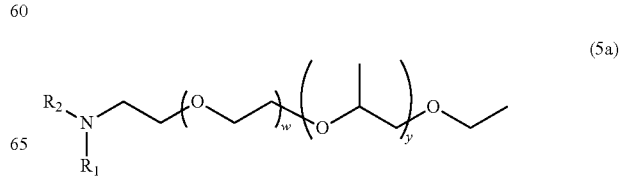

(5a)

-continued

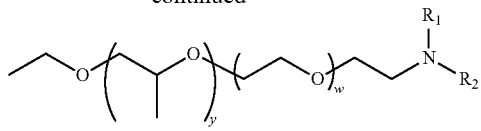
(5)

where:
w and y are independent integers in the range of 10 to 60 to provide an average molecular weight of between 800 and 4000 Daltons;

$R_1$ and $R_2$ radicals are independently selected from the group consisting of

—H; —CH$_2$(CH$_2$)$_A$B; —CEGJ; —CH$_2$CHLM; —CH$_2$(CH$_2$)$_Q$M;

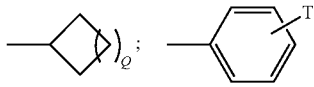

where A is a number between 1 and 9,

B is H,

E, G and J are independently a radical selected from the group consisting of: —H, methyl, ethyl, n-propyl, iso-propyl, sec-butyl, iso-butyl, tert-butyl, n-butyl, phenyl, cyclohexyl, and cyclopentyl, L is a radical represented by methyl or ethyl and M is a hydroxyl group, Q is a number between 1 and 5, T is selected from the group consisting of —H, methyl, ethyl, n-propyl, iso-propyl, sec-butyl, iso-butyl, tert-butyl, n-butyl, phenyl, cyclohexyl, cyclopentyl, NO$_2$, Cl, F and Br, and

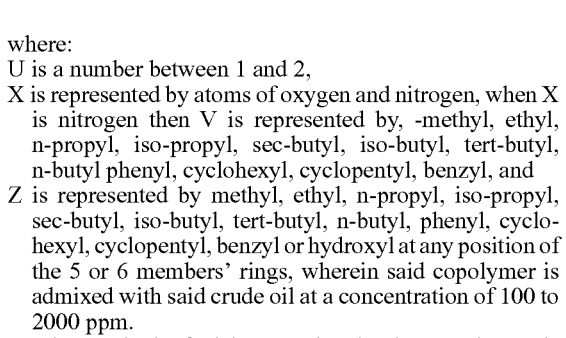
(5b)

where:
U is a number between 1 and 2,

X is represented by atoms of oxygen and nitrogen, when X is nitrogen then V is represented by, -methyl, ethyl, n-propyl, iso-propyl, sec-butyl, iso-butyl, tert-butyl, n-butyl phenyl, cyclohexyl, cyclopentyl, benzyl, and Z is represented by methyl, ethyl, n-propyl, iso-propyl, sec-butyl, iso-butyl, tert-butyl, n-butyl, phenyl, cyclohexyl, cyclopentyl, benzyl or hydroxyl at any position of the 5 or 6 members' rings, wherein said copolymer is admixed with said crude oil at a concentration of 100 to 2000 ppm.

5. The method of claim 4, wherein the copolymer is admixed with the crude oil at a concentration of 150-1500 ppm.

6. The method of claim 4, wherein the copolymer is admixed with the crude oil at a concentration of 200 to 1000 ppm.

7. The method of claim 4, wherein the copolymer has a dispersibility of 1.03 to 1.30.

8. The method of claim 4, wherein the copolymer has a dispersibility of 1.05 to 1.20.

* * * * *